(12) United States Patent
McMillen et al.

(10) Patent No.: US 6,893,089 B2
(45) Date of Patent: May 17, 2005

(54) METHOD AND APPARATUS FOR LUMBAR SUPPORT WITH INTEGRATED ACTUATOR HOUSING

(75) Inventors: Robert McMillen, Tecumseh (CA); Edward J. L. Meszaros, Windsor (CA)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 10/704,246

(22) Filed: Nov. 7, 2003

(65) Prior Publication Data

US 2004/0113472 A1 Jun. 17, 2004

Related U.S. Application Data

(63) Continuation of application No. 09/993,579, filed on Nov. 16, 2001, now Pat. No. 6,676,214.

(51) Int. Cl.$^7$ ............................................. A47C 3/025
(52) U.S. Cl. ................. 297/284.4; 297/284.1; 297/284.7; 297/284.2; 297/284.3; 297/284.8
(58) Field of Search ................. 297/284.1, 284.4, 297/284.7, 284.2, 284.3, 284.8

(56) References Cited

U.S. PATENT DOCUMENTS 6,616,227 B2 * 9/2003 Blendea et al. .......... 297/284.4
6,676,214 B2 * 1/2004 McMillen et al. ....... 297/284.1

FOREIGN PATENT DOCUMENTS

EP           1046539         10/2000

* cited by examiner

*Primary Examiner*—Laurie K. Cranmer
(74) *Attorney, Agent, or Firm*—Husch & Eppengerger, LLC; Grant D. Kang

(57) ABSTRACT

A lumbar support for a seat includes an archable pressure surface having an upper region and a lower region and a force actuator such as an electric motor. The force actuator is held in a housing. The actuator housing is fixedly attached to said archable pressure surface in a compact design. A force transmission element such as a cable is connected to at least one of the upper and lower regions of the pressure surface and the force transmission element is also connected to the actuator. When force is applied by the force actuator to the cable, the pressure surface arches from a substantially flat position to an arched position.

21 Claims, 17 Drawing Sheets

US 6,893,089 B2

METHOD AND APPARATUS FOR LUMBAR SUPPORT WITH INTEGRATED ACTUATOR HOUSING

CROSS-REFERENCE TO RELATED APPLICATIONS

This application is a Continuation of application Ser. No. 09/993,579, filed Nov. 16, 2001, now U.S. Pat. No. 6,676,214 and claims priority thereto.

STATEMENT REGARDING FEDERALLY SPONSORED RESEARCH OR DEVELOPMENT

Not Applicable

BACKGROUND OF THE INVENTION

1. Field of the Invention

This invention relates generally to ergonomic weight support devices, especially arching lumbar supports for seats.

2. Related Art

Lumbar supports for seats, particularly automobile seats, are known. See U.S. Pat. Nos. 5,050,930; 5,397,164; 5,498,063; 5,626,390; 5,775,773; 6,003,941; 4,354,709; 4,452,485; 4,632,454; 4,880,271; GB 2 013 487A and D 169 293 Bi. These devises all have in common one or more flexible members that may be flexed in order to create a convex surface with its apex towards the lumbar spine of a human being sitting in the seat into which the device is incorporated. This convex flexion is induced by any of a great variety of means for compression, See, e.g., U.S. Pat. No. 4,354,709 or tension, See, e.g., U.S. Pat. No. 5,498,063. It is common among these prior art lumbar supports that both an upper extremity of the convex pressure element and the lower extremity of it are anchored to a framework within the seat. These upper and lower elements may be fixedly anchored or movably anchored, or a combination of the two, so long as they may be pulled or pushed closer together to project an apex of the convexity farther out from the plane of the seat for greater lumbar support. Conversely, tension may be released in order to move the apex of the convexity closer to the plane of the seat for less lumbar support.

Whether the pressure producing a greater or lesser convexity is produced by compression or tension, all prior art lumbar support devices have used multiple moving parts, many of which are under dynamic tension for actuation of the convexity, and again under dynamic tension for supporting the weight of the seat passenger. The multiplicity of moving parts in prior art lumbar supports complicates manufacture, increases expense of materials necessary, increases the likelihood of component failure and shortens the life span of the devices.

Moreover, prior art lumbar supports require a relatively large amount of space to 15 accommodate the relatively cumbersome tensioning or compression apparatuses, together with the frameworks necessary for their support.

As seat designs are modified to incorporate more comfort devices, such as duct work for heating and cooling, the amount of space available inside seats for lumbar support devices shrinks. There is need for smaller lumbar supports.

There is a need in the art for a universal ergonomic support which occupies less space, costs less to manufacture and install, simplifies manufacture, decreases needed components, uses a more robust mechanism for supporting the weight of a human passenger and/or may be more universally used for lumbar, head and neck and thigh support as well as only lumbar support.

SUMMARY OF THE INVENTION

This invention is an integrated lumbar support pressure plate and actuator motor housing. Conventional lumbar supports typically flex a pressure surface into an arch by means of traction drawing together the ends of the pressure plate. This tension is frequently actuated by means of a traction cable powered by an electric motor.

Prior configurations of lumbar supports generally located the actuator motor outside the profile of the pressure surface. The present invention locates the actuator motor within the profile of the pressure surface, saving space. Moreover, the present invention actually incorporates the housing for the electric motor on the back of the pressure surface itself, reducing the need for additional components and assembly time to attach the motor to a seat-frame.

The pressure surface/motor housing is a single molded plastic unit. The actuator motor is anchored in its housing on the back of the pressure surface. Upon engagement of the motor it draws a traction cable that is directed to engage both ends of the pressure surface in order to draw them together. The longer the motor is engaged, the closer together the cable draws the ends of the pressure surface, and thereby the greater the degree of convexity of the pressure surface. Releasing the tension lengthens the traction cable and flattens the pressure surface. In this manner a seat occupant can control the degree of lumbar support.

The present invention reduces the number of components necessary to assemble a lumbar support unit. It is compact in size for ease of packaging, and ease of incorporation into a variety of different seats. The present invention reduces costs required to manufacture, sell, assemble, maintain and operate the lumbar support. The present invention eases and streamlines the manufacture of the lumbar supports and of seats incorporating it, to lower production cost and increase durability and useful life.

The present invention may be incorporated easily with existing components, for example, seat frames, and with future seats that may have less space available within them. It does not require guide wires, outside actuators, attachment brackets or long cables.

Further features and advantages of the present invention, as well as the structure and operations and various embodiments of the present invention, are described in detail below with reference to the accompanying drawing.

DETAILED DESCRIPTION OF THE PREFERRED EMBODIMENTS

Figure 1:
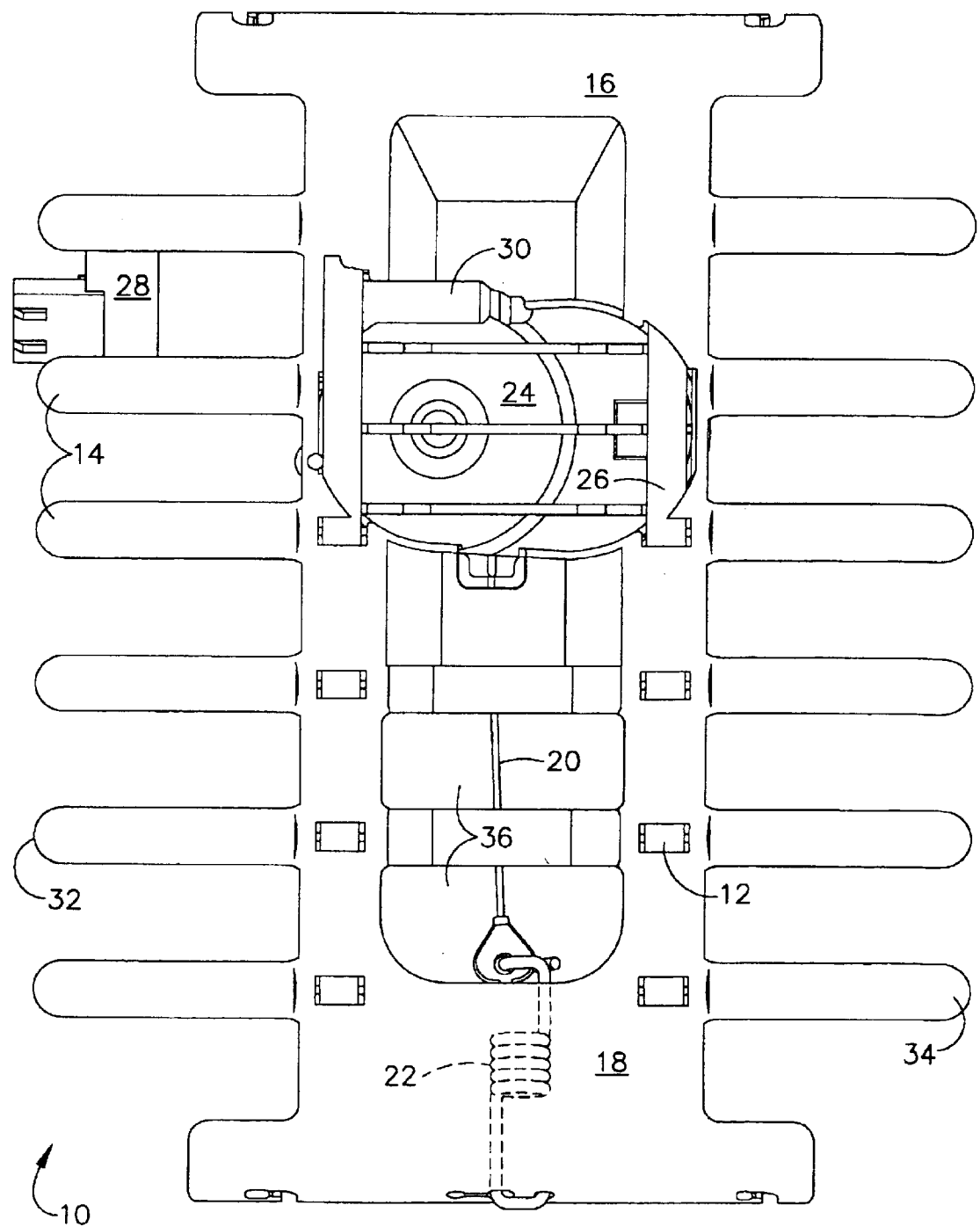
FIG. 1 is a front view of the lumbar support with integrated actuator housing of the present invention.

Referring to the accompanying drawings in which like reference numbers indicate like elements, FIG. 1 is a front view of the lumbar support with integrated actuator housing of the present invention.

Lumbar support devices are manufactured in a variety of configurations. One type of lumbar support mechanism is characterized by an arching pressure surface which is with an upper region and a lower region. The upper region and lower region are brought closer together by any of a variety of mechanical means, and this closing movement of the ends of the pressure surface bows the pressure surface outwards in an arch that is convex towards the seat occupant. The mechanism for arching the pressure surface can compress the encapsulated ends, or draw them together by traction. The depicted embodiment is a development of the traction family of arching lumbar supports, although a compression embodiment is also considered to be within the scope of the present invention.

Traction is typically achieved by means of a cable attached to one end of the arching pressure surface. A bracket or other fixation device at the other end of the arching pressure surface may anchor the other end in a stationary position. Alternatively, the other end of the pressure surface may also move, requiring some form of mechanical cooperation with the traction cable. This is often by a bowden cable, whose sleeve is anchored to the other end of the pressure surface. The tractive force is generally actuated either by mechanical means, as by a handwheel or lever, or by an electric motor. The present invention is a development of electric motor traction means.

FIG. 1 is a front view of the lumbar support with integrated actuator housing of the present invention. The arching pressure surface is indicated generally at 10. The pressure surface is commonly made of a single piece of metal or plastic (although, equivalently, it may be assembled from components). A typical configuration is to have two vertical bars, 12, intersecting horizontal transverse ribs, 14. Together this lattice of vertical and horizontal members projects the seat cushion towards the occupant's lumbar spine to provide lumbar support.

The general arching pressure surface, 10, also incorporates upper and lower regions, 16 and 18. It is by drawing these two regions together that a supporting convex arch is created in the pressure surface, 10. In the depicted embodiment, a traction cable, 20, is affixed to the bottom region, 18, of generalized pressure surface, 10. In this alternative embodiment the traction cable, 20, communicates with bottom region, 18, via spring, 22. The spring graduates the forces between the cable, 20, and the bottom region, 18, of the generalized pressure surface, 10, and also serves to absorb abusive loads put on the device.

The other end of traction cable, 20, is attached to the other of the generalized pressure surface terminal regions, in this case upper region 16. In the prior art this attachment would be had by a bracket and the traction cable would continue to a removed position where a mechanical or electrical motor actuator would require a housing or other anchoring to secure it to a seat frame or additional components of the lumbar support. In the present invention traction cable, 20, is affixed to upper region, 16, via the integrated housing, 24, which is molded into the plastic generalized pressure surface, 10, at or near the upper region, 16, as an integral part of it. Alternatively, the housing and pressure surface may be assembled metal pieces.

Housing, 24, contains the mechanical apparatus to put tractive force on traction cable, 20, in this case a geared spindle, 26. Geared spindle, 26, is powered by electric motor, 28, which is secured in place at a boss bolted or molded into the integrated pressure surface/housing of the present invention at 30. Engagement of motor, 28, rotates spindle, 26, puts tractive force on cable, 20, and draws lower region, 18, towards upper region, 16, thereby creating an arch in the generalized pressure surface, 10. In the front view depicted in FIG. 1 the arch would be out of the plane of the page and towards the viewer.

The upper region, 16, and housing, 24, are fabricated as a solid unit without intervening gaps between the transverse ribs, 14, or the vertical members, 12. Apex rib, 32, and bottom rib, 34, are different from ribs 14 in their relationship to vertical members, 12, in that there are intervening holes between the vertical members and apex rib, 32, and bottom rib, 34, indicated at 36. Holes, 36, create a structure which is weaker between the bottom of the series of ribs, 14, and bottom rib, 34. The absence of holes in top region, 16, and between ribs 14 creates a part of the general pressure surface, 10, which is stronger and more resistant to flexion upon the application of tractive force. This creates maximum flexion at the desired location apex rib, 32. This also creates asymmetrical convexity, which is desirable since it more closely parallels the curvature of the average human spine. Apex rib 32 is located more near the pelvis of the average passenger, while less bowed ribs, 14 would correspond to the upper lumbar vertebrae and lower thoracic area of the average passenger. Hence molding housing, 24, into upper region, 16, creates the desired asymmetry in the convexity of the general pressure surface, 10. The integration of housing, 24, with upper region, 16, also adds strength.

Figure 2:
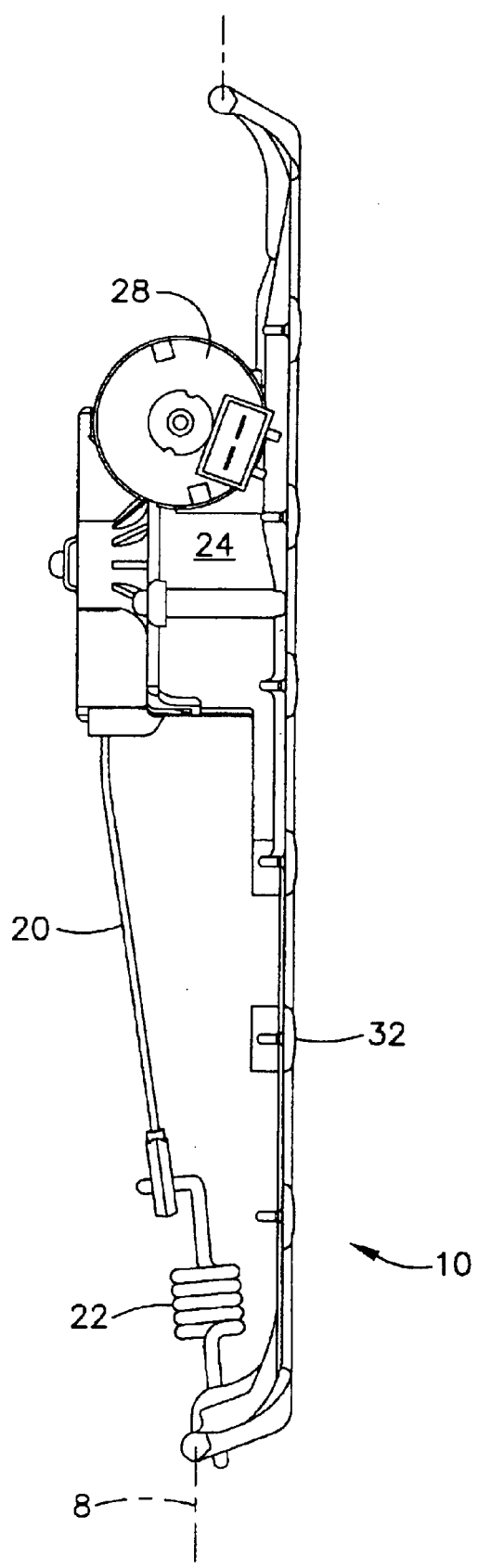
FIG. 2 is a side view of the lumbar support with integrated actuator housing of the present invention in a flat position.
Figure 3:
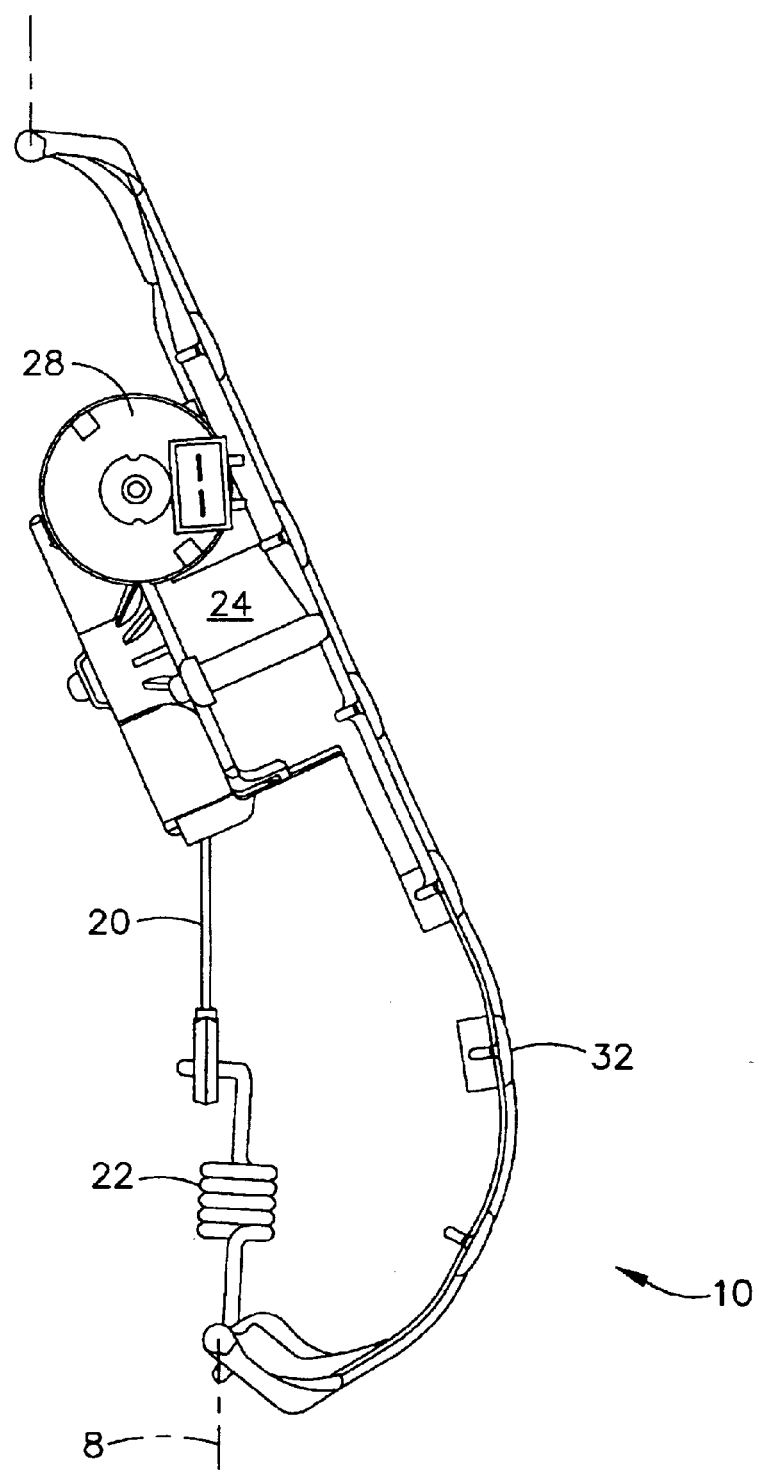
FIG. 3 is a side view of the lumber support with integrated actuator housing of the present invention in an arched, lumbar supporting position.

The advantage of this configuration is more apparent in FIGS. 2 and 3, side views which demonstrate the functionality of the lumbar support. FIG. 2 is the lumbar support with traction cable, 20, relaxed and the generalized pressure surface, 10, in a substantially flat position. FIG. 3 shows the general pressure surface in an arched, lumbar supporting position, achieved by applying and holding tractive force to cable, 20. It can be seen that the apex of the arch occurs substantially at apex rib 32. Dashed line 8 indicates the location of a guide wire or rail on which the arching pressure surface slides.

Figure 4:
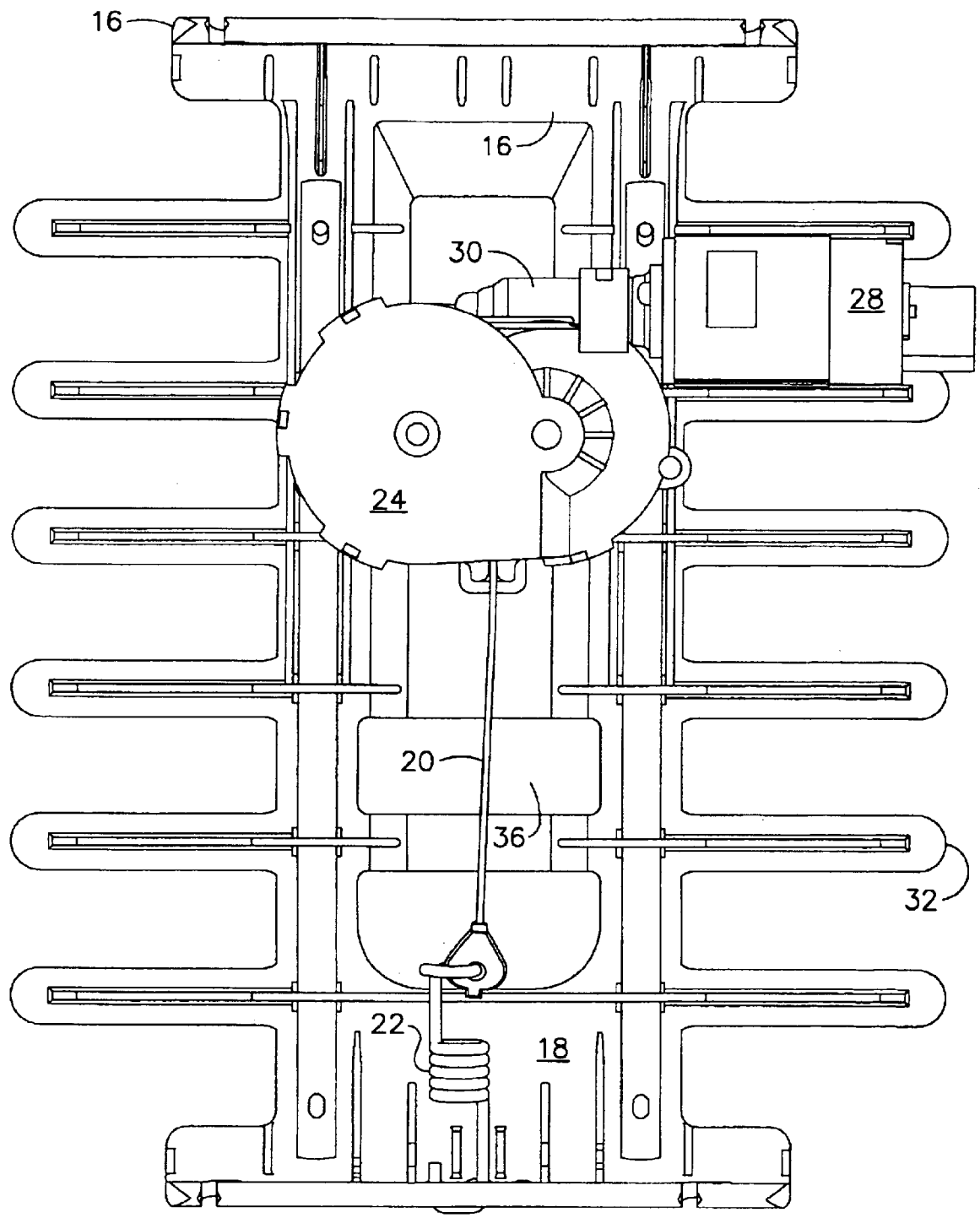
FIG. 4 is a back view of the lumbar support with integrated actuator housing of the present invention.
Figure 5:
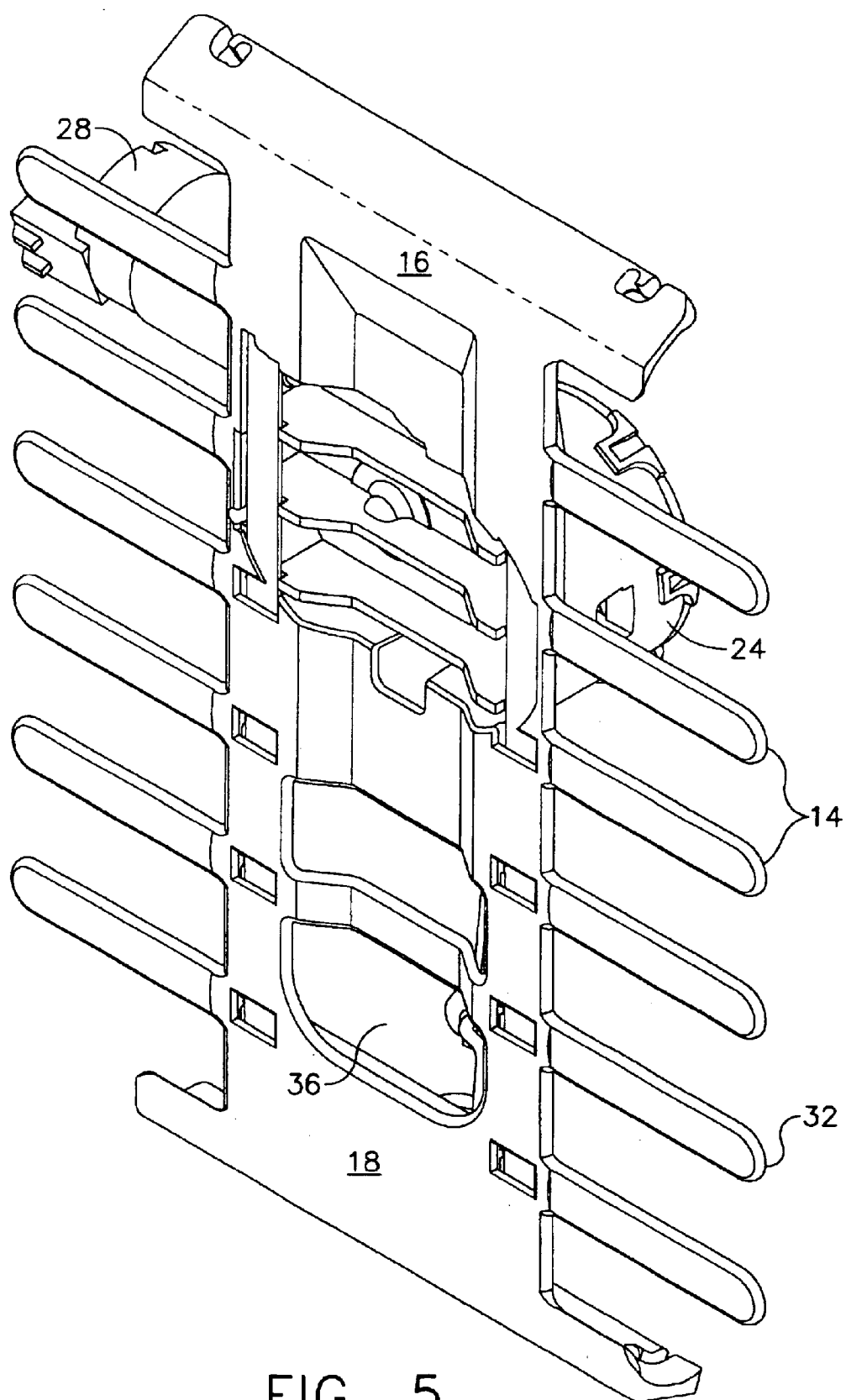
FIG. 5 is an oblique view of the front of the lumbar support with integrated actuator housing of the present invention.
Figure 6:
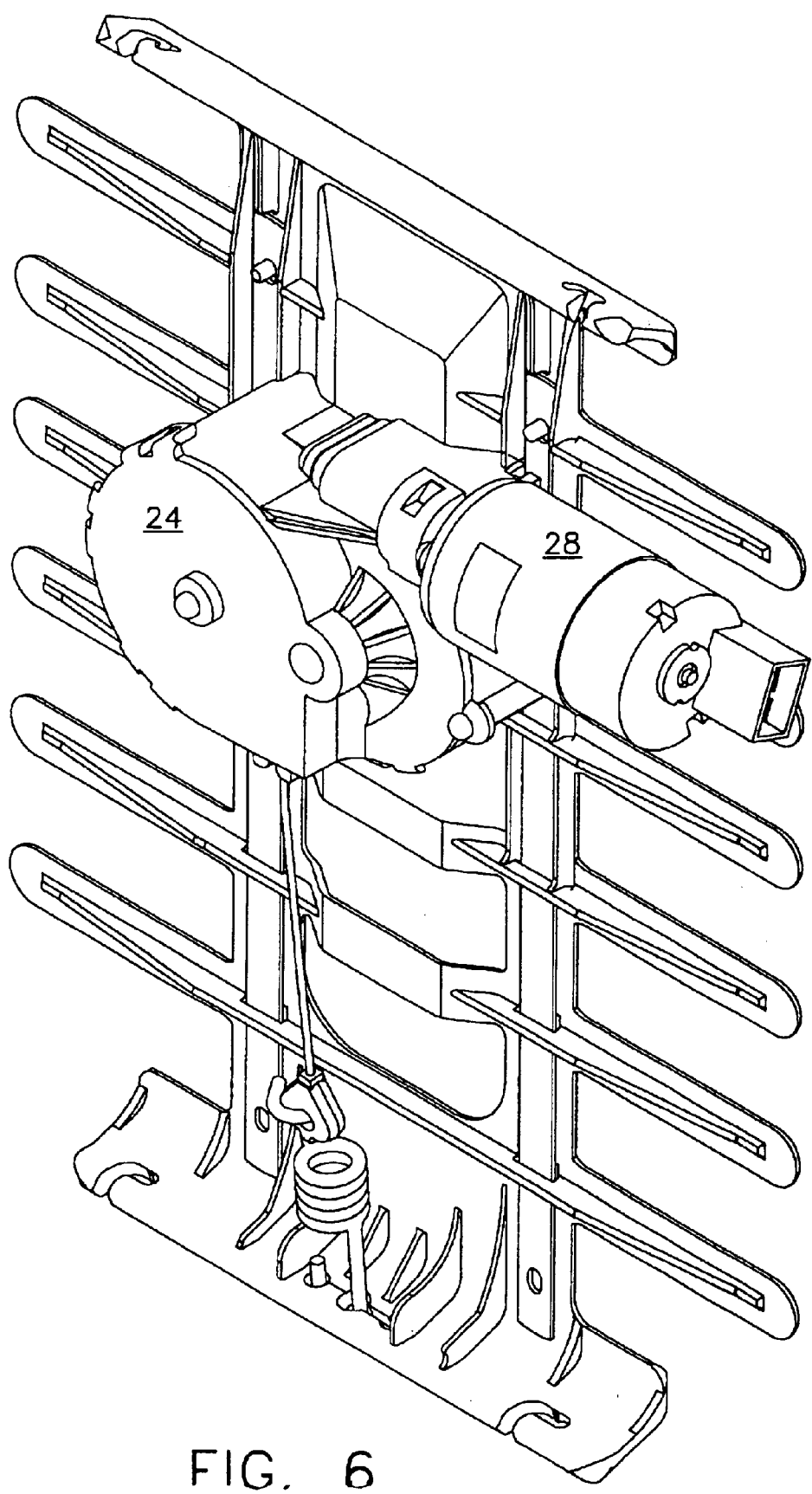
FIG. 6 is an oblique view of the rear of the lumbar support with integrated actuator housing of the present invention.
Figure 7:
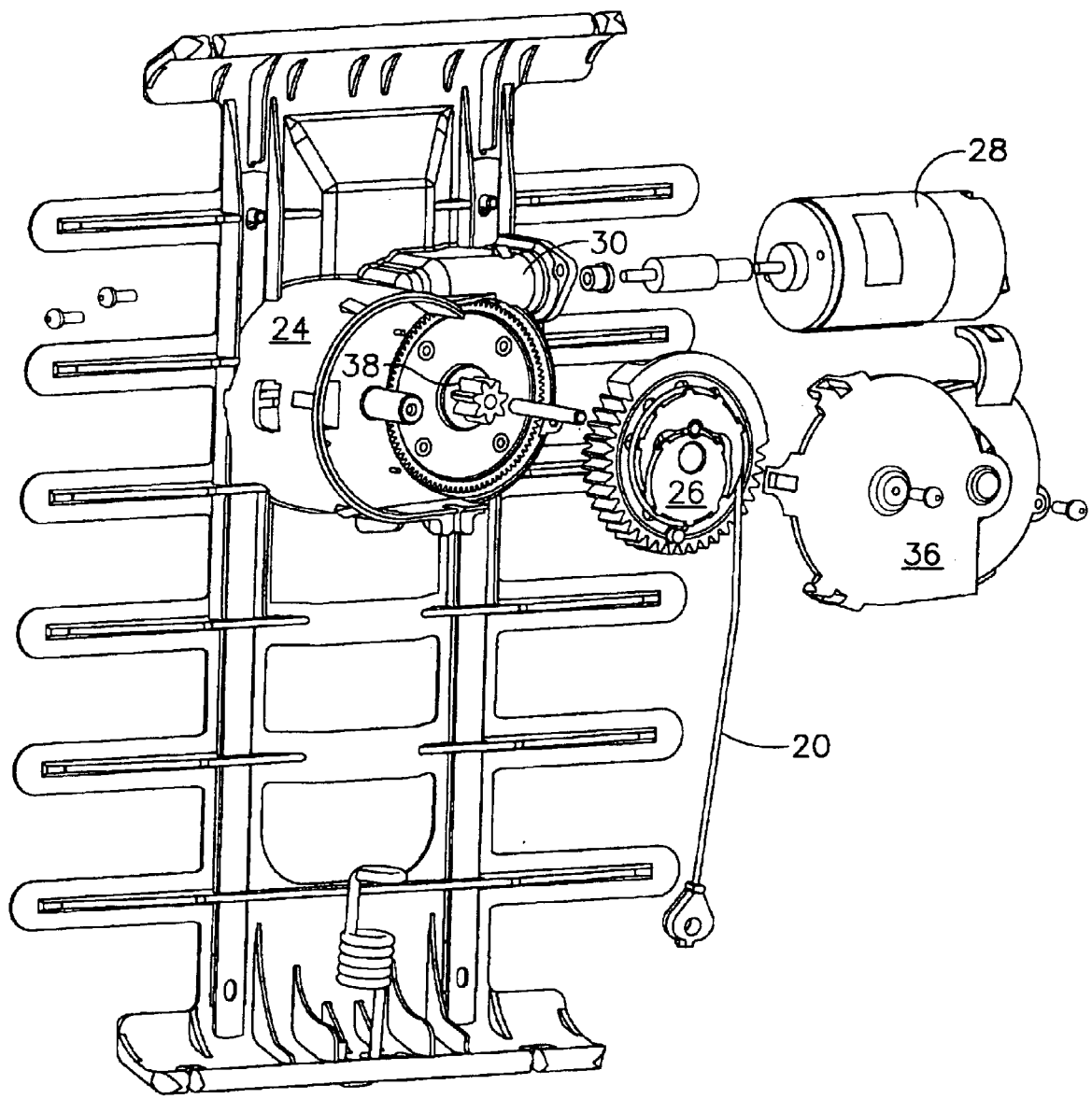
FIG. 7 is an exploded view of the lumbar support with integrated actuator housing.

The back view depicted in FIG. 4 more clearly shows the assembled housing, 24, enclosing the geared spindle (obscured) and molded boss, 30, holding motor, 28.

Exploded view 7 more clearly illustrates the assembly of motor, 28, inserted into boss, 30, and housing 24 configured to receive geared spindle, 26, with traction cable, 20, partially wound about it and anchored to it. Housing cover, 36, covers and secures the entire assembly. Geared spindle, 26, is driven by geared axle, 38, which is in geared communication with the axle of motor 28.

A variety of embodiments are considered to be within the scope of the present invention. Another alternative embodiment of an actuator housing integrated with a general pressure surface is depicted in FIGS. 8 through 17. The previous embodiment depicted in FIGS. 1 through 7 was capable of moving the lumbar support in two directions: in and out. The second embodiment depicted in FIGS. 8 through 17 is capable of moving the lumbar support in four directions. In addition to bowing the arching pressure surface in and out, this embodiment can raise and lower the whole assembly in order that a seat occupant may move the apex of the lumbar support vertically to the most comfortable position for the occupant's spine.

Figure 8:
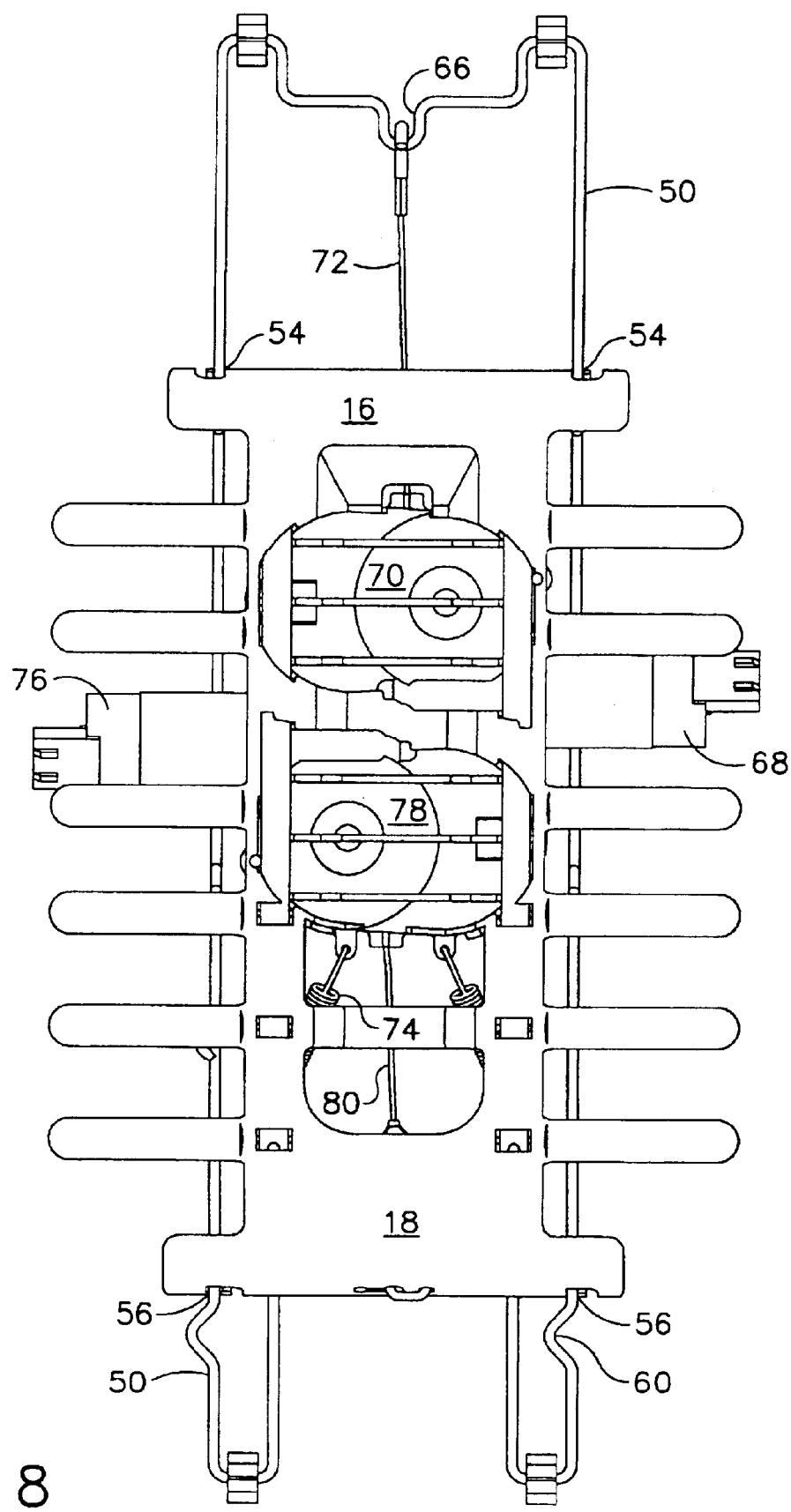
FIG. 8 is a front view of a four-way lumbar support with integrated actuator housing of the present invention.
Figure 9:
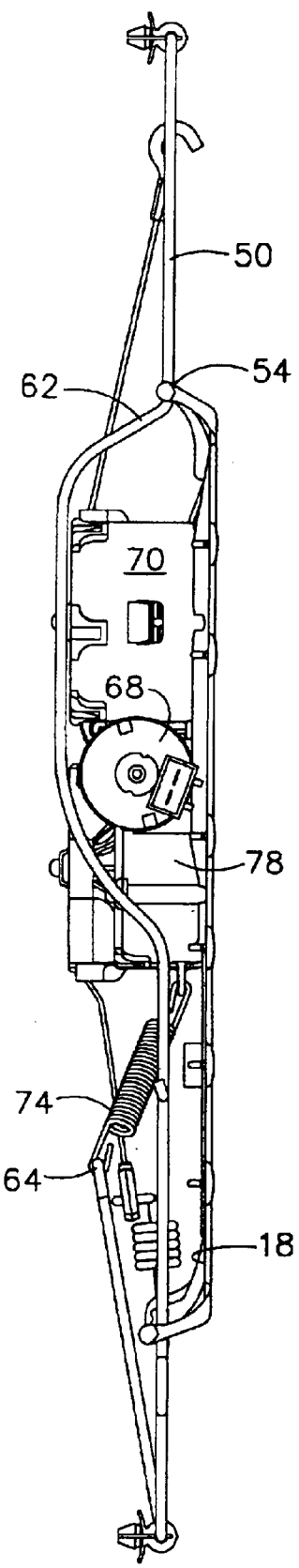
FIG. 9 is a side view of a four-way version of the lumbar support with integrated actuator housing of the present invention.
Figure 10:
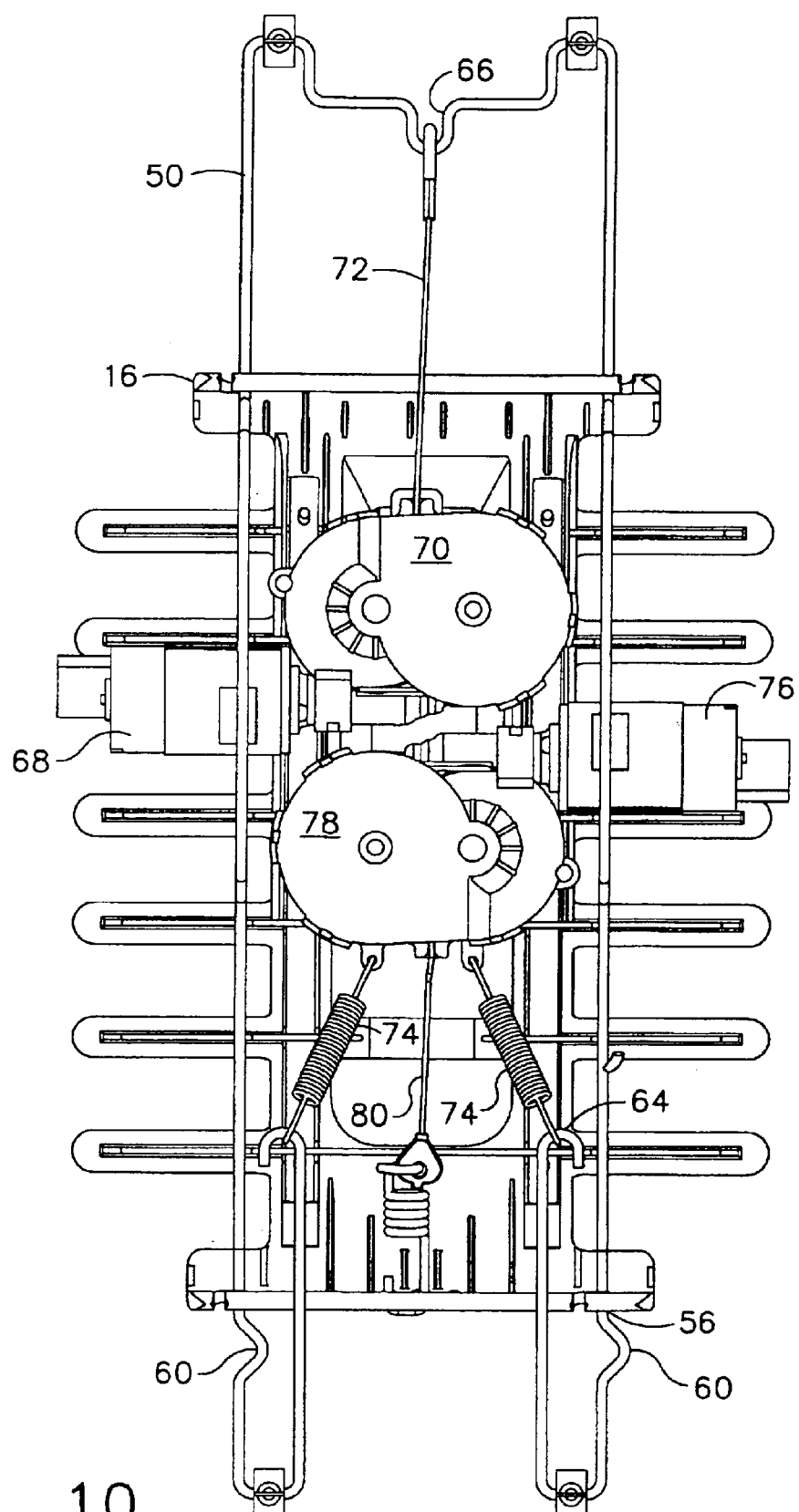
FIG. 10 is a back view of the four-way version of the lumbar support with integrated actuator housing of the present invention.
Figure 11:
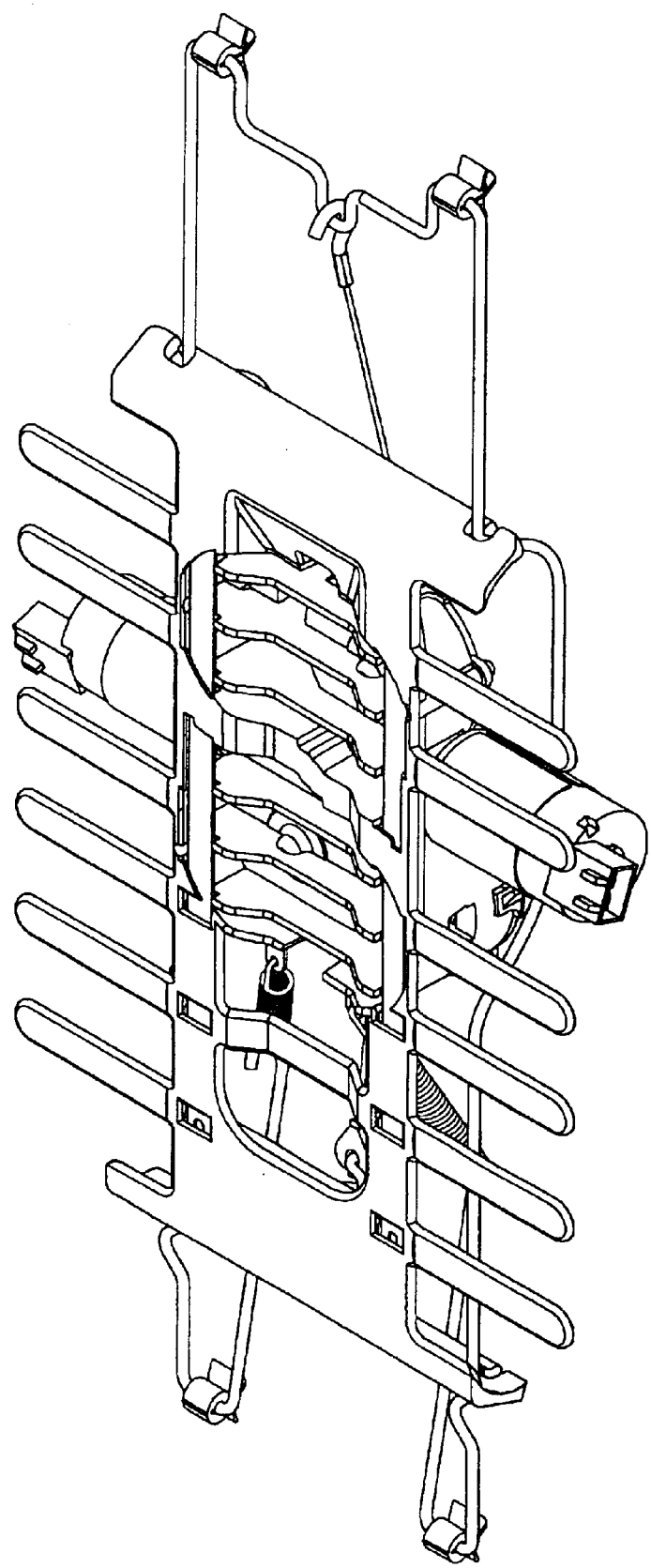
FIG. 11 is an oblique view of the front of the four-way version of the lumbar support with integrated actuator housing of the present invention.
Figure 12:
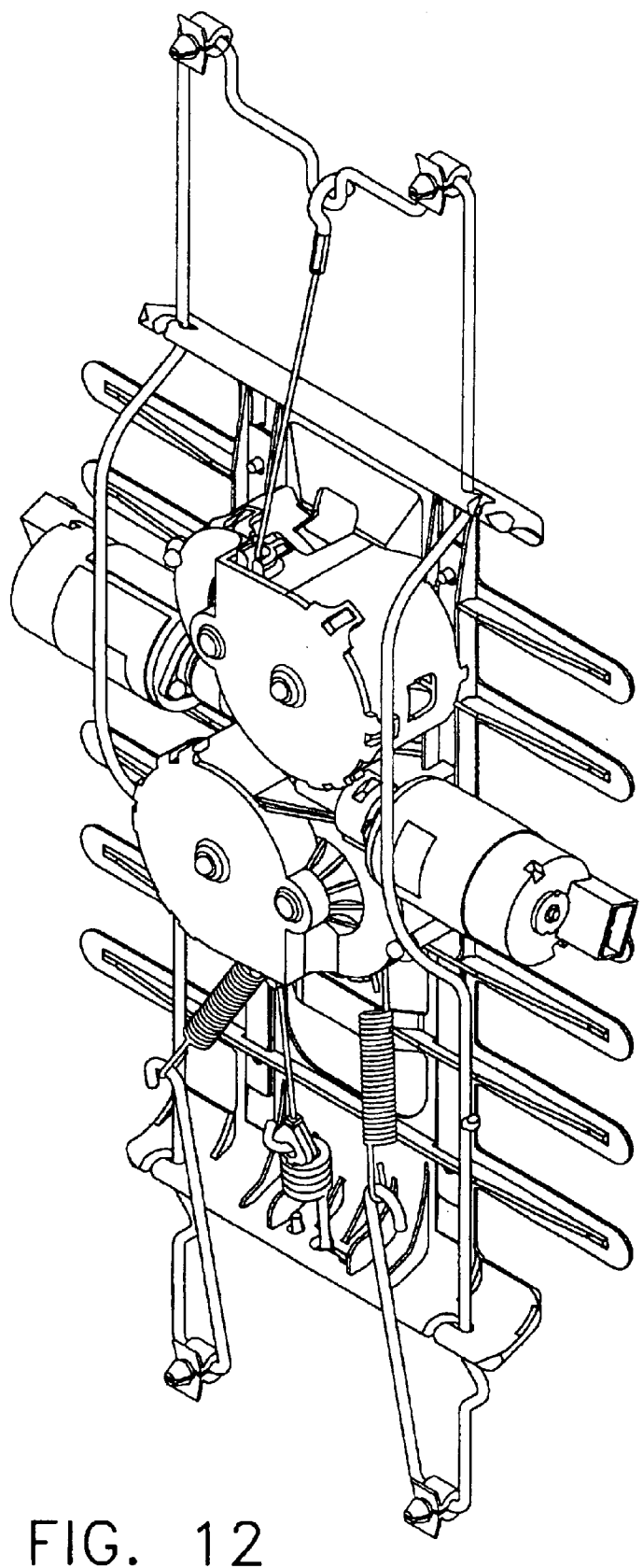
FIG. 12 is an oblique view of the rear of the four-way version of the lumbar support with integrated actuator housing of the present invention.
Figure 13:
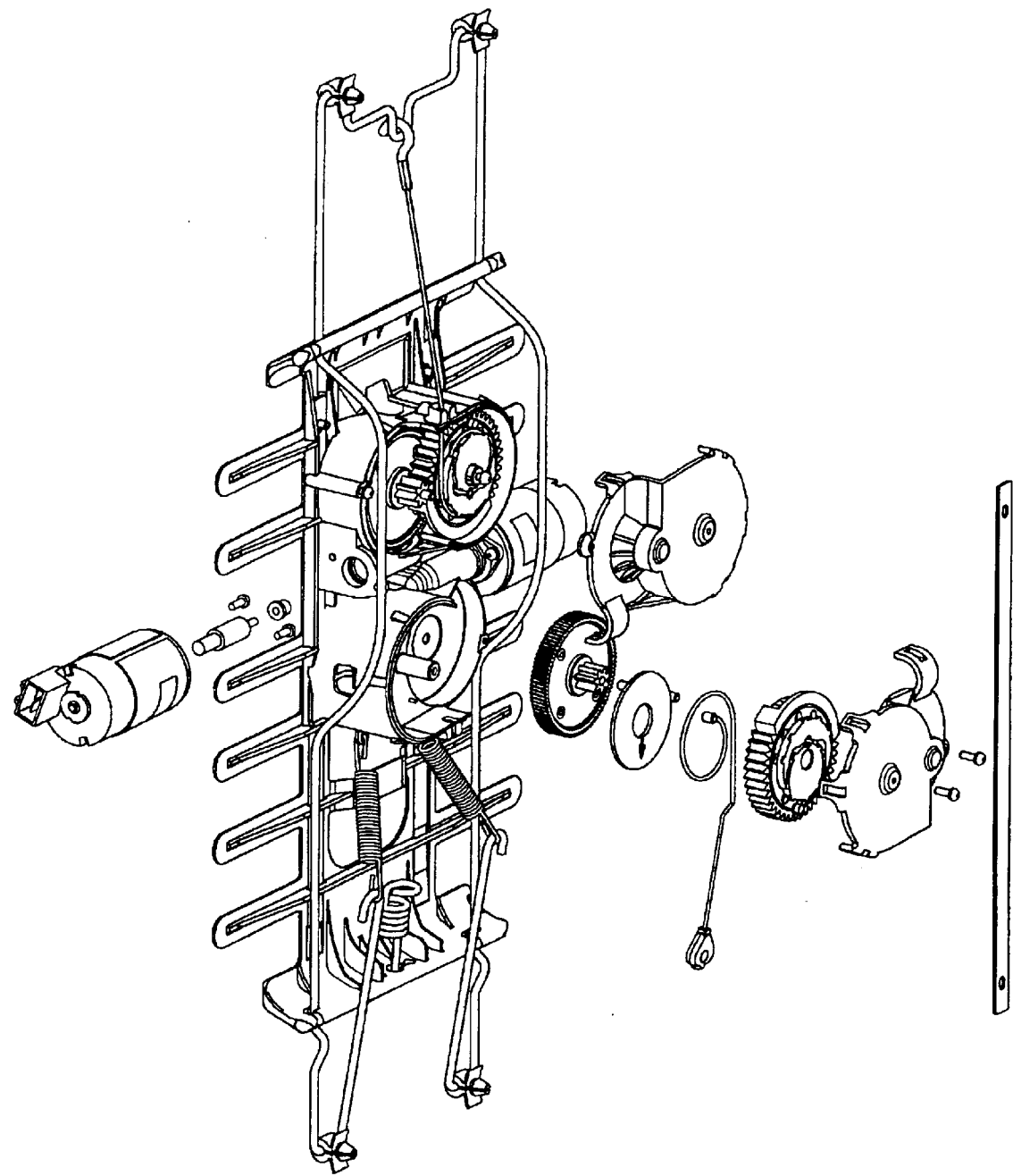
FIG. 13 is an exploded view of the four-way version of the lumbar support.
Figure 14:
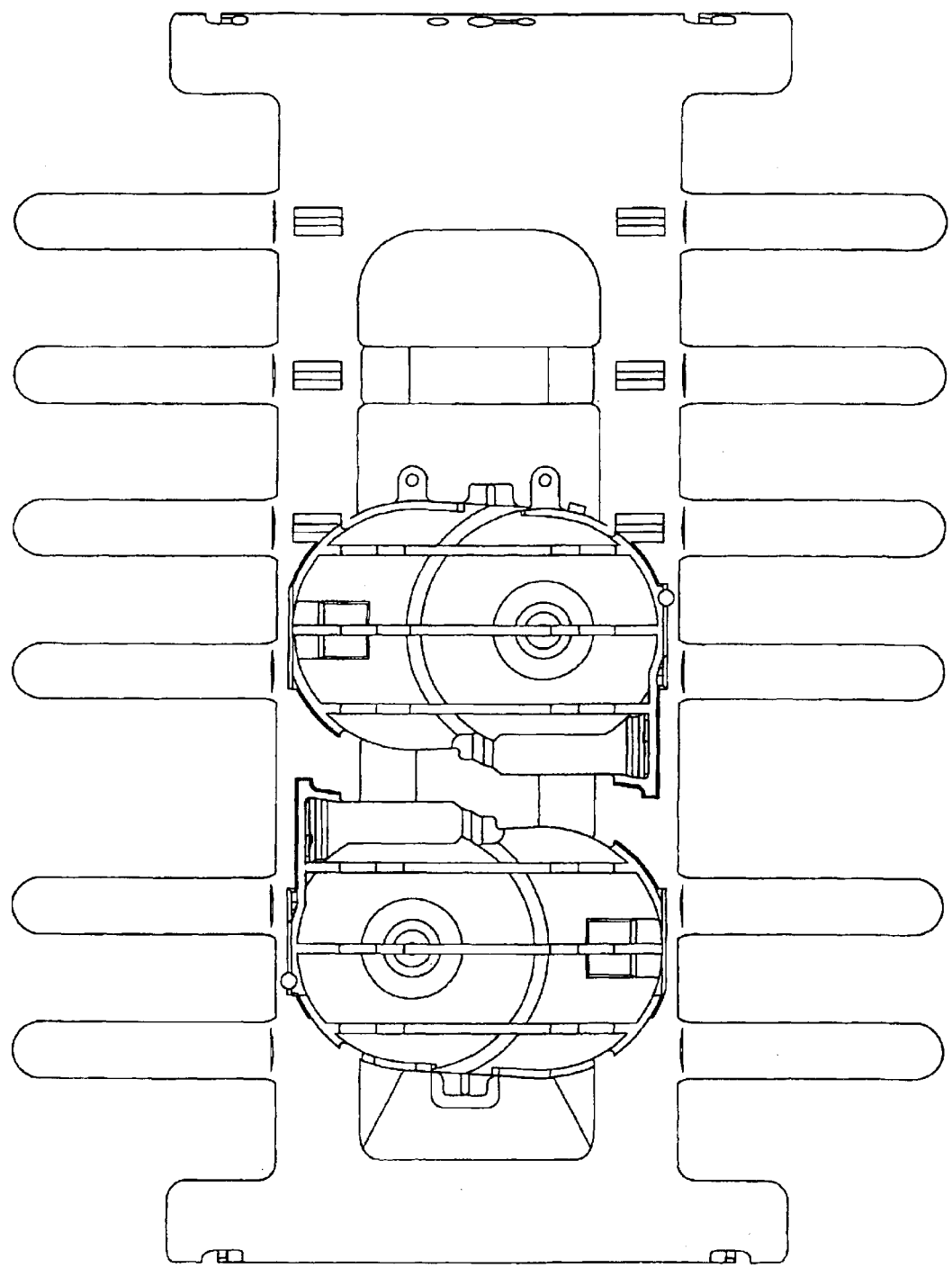
FIG. 14 is a front view of the four-way version of the integrated actuator housing and pressure surface of the present invention, without any other components assembled.
Figure 15:
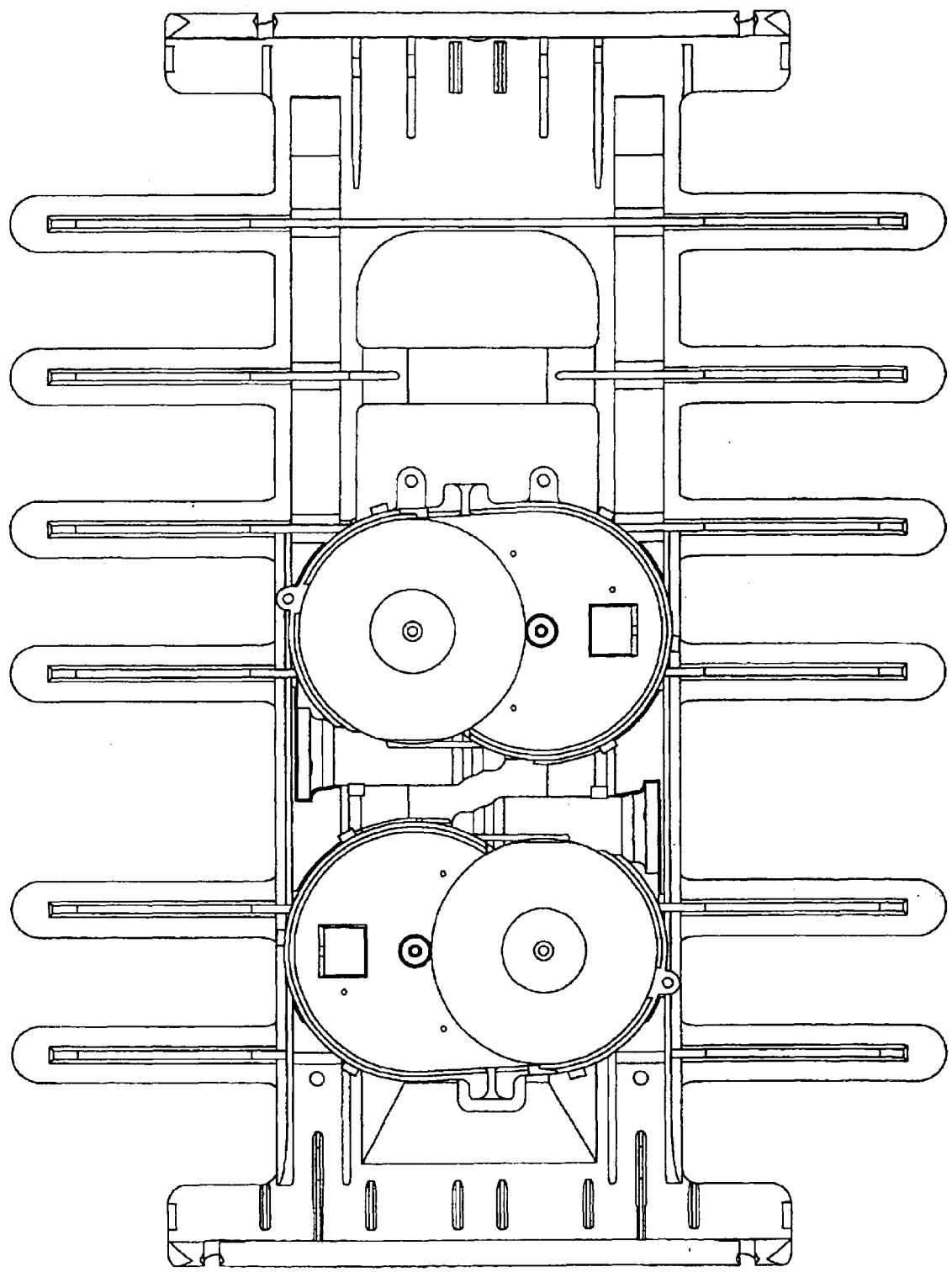
FIG. 15 is a rear view of the four-way version of the integrated actuator housing and pressure surface of the present invention, without any other components assembled.
Figure 16:
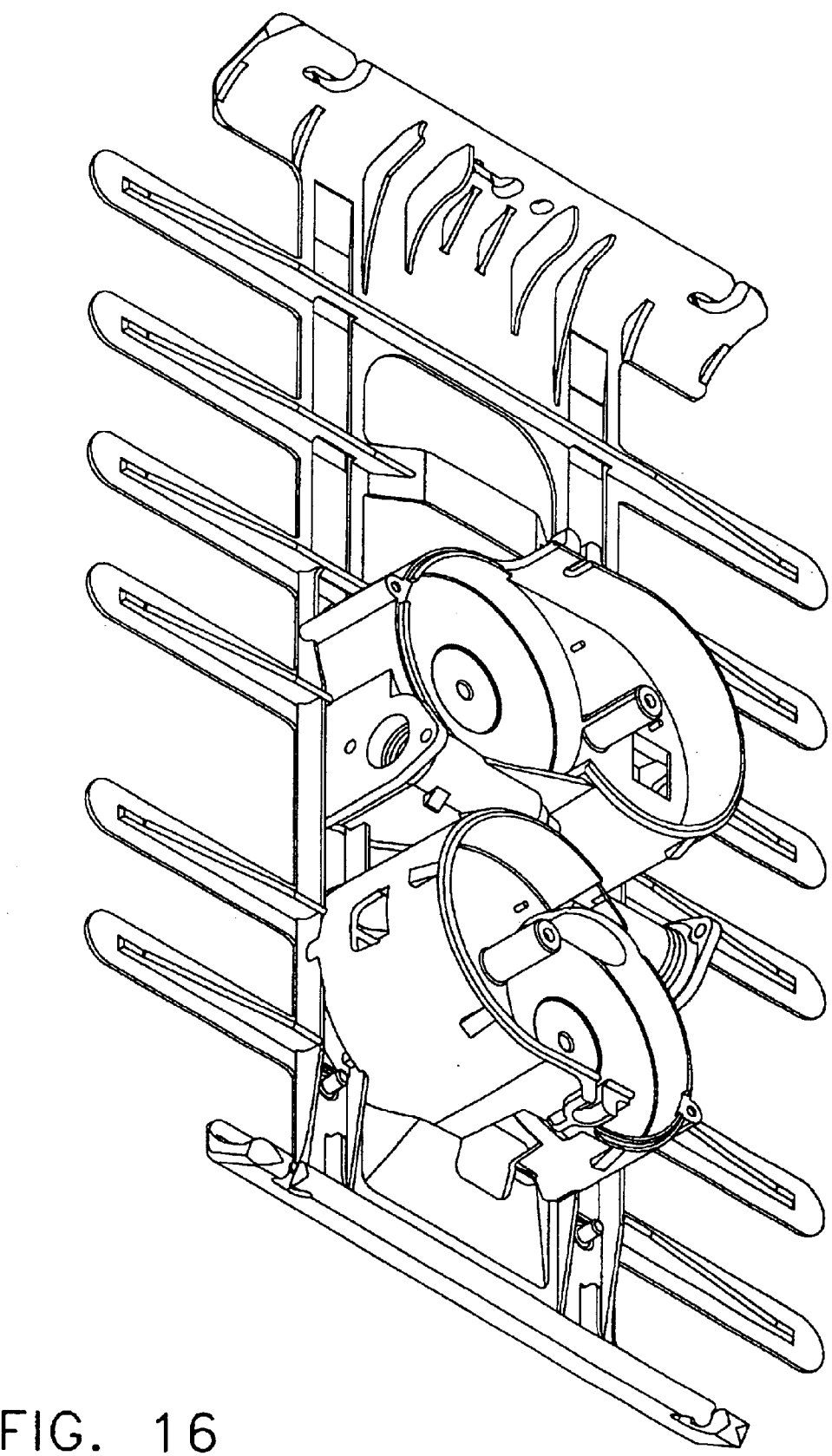
FIG. 16 is an oblique view of the four-way version of the integrated actuator housing and pressure surface of the present invention, without any other components assembled.
Figure 17:
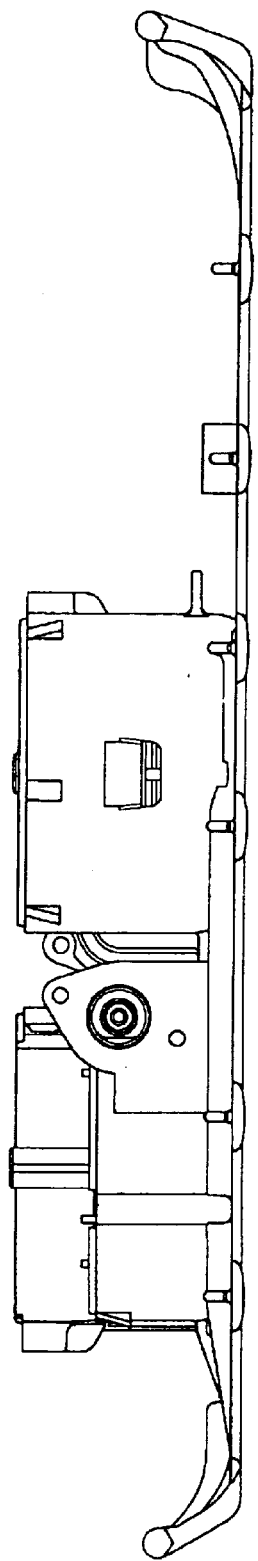
FIG. 17 is a side view of the four-way version of the integrated actuator housing and pressure surface of the present invention, without any other components assembled.

FIGS. 8, a front view, 9, a side view, 10, a back view, 11, an oblique back view, 12, an oblique front view, and 13, an exploded view depict the additional components for adding the raising and lowering capability to this embodiment. First is guide wire 50. Guide wire 50 serves a dual purpose. First, it is a framework to hold the entire lumbar support unit which may be attached to a seat frame, seat suspension lattice, or back plate according to known technologies. Secondly, the generalized pressure surface 10 is slidingly engaged with the long dimension of guide wire 50 by means of slots, holes or clamps disposed at upper region 16 at 54 and lower region 18 at 56. The generalized pressure surface 10 moves up and down guide rails 50 as the clamps or slots 54 and 56 slide along the guide rails 50. The "four way" lumbar support unit is depicted in its lowermost position. It can be seen that the downward travel of the generalized pressure surface 10 is arrested at a pre-defined bottom terminus by arresting bends in the guide wires at 60 and 62. Upwards travel of the generalized pressure surface 10 is arrested by guide wire ends 64 and vertical traction cable anchor 66.

Upwards travel of the generalized pressure surface 10 along guide rails 50 is actuated by motor 68 driving geared spindle 70 in order to apply a tractive force to vertical travel on traction cable 72. By rotating the geared spindle 70 in a direction to take in vertical travel traction cable 72 (clockwise in front view FIG. 8) the generalized pressure surface 10 is pulled in an upwards direction along guide rails 50. Opposing this force are downward traction springs 74. The tension on these springs, gearing of geared spindle 70 and torque of electric motor 68 are pre-configured so that actuation of motor 68 is capable of overcoming the tractive tension of springs 74 so that the lumbar support may be moved upwards. The tractive force of springs 74 are also pre-configured to be able to draw the generalized pressure surface 10 back down when the tractive force on vertical travel traction cable 72 is released.

The in and out bowing of the generalized pressure surface convex arch is controlled by the cooperative operation of motor 76, geared spindle 78 and traction cable 80 in the same manner as described above in the "two way" lumbar support.

FIGS. 14 through 17 depict the single part, the integrated pressure surface and actuator housing, without the other assembly components.

It can be readily appreciated that the advantageous compact nature of the present invention allows sufficient space on the back of the generalized pressure surface for molding in two actuator housings and two motor support bosses to facilitate four way control of the lumbar support as well as two way control. The compact design allows extra room in the seat for installation of other components.

Those of skill in the art will recognize that the integrated lumbar support and actuator housing of the present invention also facilitates ease of assembly and reduces component costs by eliminating the need for separate fixation and additional components for that fixation otherwise necessary for anchoring actuators and actuator motors external to the lumbar support.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

What is claimed is:

1. A lumbar support with an integrated actuator housing and pressure surface comprising:

an arching pressure surface having an upper region and a lower region;

a first actuator housing integrally fixed to one of said upper region or said lower region of said arching pressure surface;

motorized actuator disposed within said first actuator housing;

a first fraction element having a first portion and a second portion, said first portion being in communication with one of said upper region or said lower region of said arching pressure surface, said second portion being in communication with said first actuator such that tension on said first fraction element exerted though said first actuator housing draws said upper region and said lower region of said arching pressure surface toward one another to form an arch;

a second actuator housing attached to said arching pressure surface;

a second actuator disposed within said second actuator housing;

a guide in supporting sliding engagement with said arching pressure surface;

a second traction element having a first portion and a second portion;

said first portion of said second traction element being adapted to be anchored off of said arching pressure surface; and said second portion of said second traction element being engaged with said arching pressure surface via said second actuator;

such that tension on said second traction element moves said arching pressure surface from a first position to a second position, said first position and said second position being substantially along said guide.

2. The lumbar support of claim 1 wherein said traction elements are cables.

3. The lumbar support of claim 1 wherein said archable pressure surface further comprises ribs.

4. The lumbar support of claim 1 wherein said first portion of said first traction element is in communication with one of said upper or said lower region of said arching pressure surface via a spring.

5. The lumbar support of claim 1, further comprising at least one pulley disposed between said first traction element and said pressure surface.

6. The lumbar support of claim 1 wherein said first traction element is a rack driven by a pinion, said pinion being driven by said actuator.

7. The lumbar support claim 1 wherein said actuator is an electric motor.

8. The lumbar support of claim 1 wherein said arching pressure surface and said housings are fabricated from a single piece of material.

9. The lumbar support of claim 1 wherein said pressure surface and said housings are molded from a single piece of plastic.

10. The lumbar support of claim 1 wherein said pressure surface and said housings are stamped from a single piece of metal.

11. The lumbar support of claim 1 wherein said arching pressure surface slides on guide rails.

12. A lumbar support for a seat with an integrated actuator housing comprising:

a pressure surface having an upper region and a lower region;

a first actuator housing integrally attached to said upper region;

a first motorized actuator held by said first actuator housing, said first actuator comprising;

a first geared spindle, and a first electric motor in geared, driving communication with said spindle;

a first traction cable having a first portion and a second portion, said first portion being in communication with said first spindle and said second portion being in communication with said lower region of said pressure surface;

whereby actuation of said electric motor rotates said geared spindle, rotation of said spindle puts tension on said cable, and said cable draws said upper region of said pressure surface and said lower region of said pressure surface together to create an arch in said pressure surface;

a second actuator housing fixedly attached to said upper medial region of said pressure surface;

a second actuator held in said second actuator housing, said second actuator comprising:

a second gear spindle, a second electric motor in geared, driving communication with second geared spindle;

a guide rail supporting sliding engagement of said pressure surface, said guide rail having an upper stop and a lower stop;

a second traction element having a first portion and a second portion, said first portion of said second traction element being anchored to said guide rail, said second portion of said second traction element being engaged with said pressure surface via said second actuator, such that traction on said second traction element mediates travel of said pressure surface between an upper position and a lower position, said upper and lower positions being substantially along said guide rail;

wherein said upper position of said pressure surface abuts said upper stop of said guide rail and said lower position of said pressure surface abuts said lower stop of said guide rail.

13. A method of fabricating a lumbar support for a seat comprising: attaching an actuator housing to either of an upper region or a lower region of an archable pressure surface;

housing an actuator in said actuator housing; and linking a first portion of a traction element to said traction actuator and a second portion of said traction element to the other of said upper region or said lower region of said pressure surface.

14. The method of claim 13 wherein said attaching is by stamping said archable pressure surface and said actuator housing together from metal.

15. The method of claim 13 wherein said attaching is by molding said pressure surface and said housing from a single piece of plastic.

16. The method of claim 13 wherein said actuator is an electric motor in driving, geared communication with a geared spindle.

17. The method of claim 13 wherein said traction element is a cable.

18. The method of claim 13 wherein said linking of said traction element to said pressure surface is via a spring.

19. A pressure surface for a lumbar support comprising:

an archable pressure surface having an upper region and a lower region;

said upper region and said lower region being adapted to be disposed on guide mounts in a seat frame;

at least one actuator housing integrally attached to one of said upper region or said lower region of said archable pressure surface, said at least one actuator housing being adapted to operatively mount a motorized actuator; and one of said upper region or said lower region being adapted to operatively communicate with a force transmission element linked to the motorized actuator such that said pressure surface arches when traction is applied.

20. The pressure surface of claim 19 wherein said pressure surface and said actuator housing are molded from a single piece of plastic.

21. The pressure surface of claim 19 wherein said archable pressure surface and said actuator housing are stamped metal.

* * * * *

UNITED STATES PATENT AND TRADEMARK OFFICE
CERTIFICATE OF CORRECTION

PATENT NO. : 6,893,089 B2
DATED : May 17, 2005
INVENTOR(S) : McMillen et al.

It is certified that error appears in the above-identified patent and that said Letters Patent is hereby corrected as shown below:

Column 6,
Line 55, reads "a first fraction" should read -- a first traction --
Line 60, reads "said first fraction" should read -- said first traction --

Signed and Sealed this

Nineteenth Day of July, 2005

JON W. DUDAS
*Director of the United States Patent and Trademark Office*